United States Patent [19]

Doi et al.

[11] Patent Number: 4,787,650
[45] Date of Patent: Nov. 29, 1988

[54] ACTIVE SUSPENSION APPARATUS

[75] Inventors: Shunichi Doi; Noboru Sugiura; Yasutaka Hayashi; Yuzo Yamamoto, all of Aichi, Japan

[73] Assignee: Kabushiki Kaisha Toyota Chuo Kenkyusho, Japan

[21] Appl. No.: 735,830

[22] Filed: May 20, 1985

[30] Foreign Application Priority Data

May 21, 1984 [JP] Japan .................. 59-102235

[51] Int. Cl.$^4$ ............................................. B60G 17/04
[52] U.S. Cl. ..................... 280/707; 280/708; 364/424.05
[58] Field of Search ............ 280/707, 702, 708, 688; 364/424

[56] References Cited

U.S. PATENT DOCUMENTS

| 3,124,368 | 3/1964 | Corley | 280/707 |
| 4,333,668 | 6/1982 | Hendrickson | 280/707 |

FOREIGN PATENT DOCUMENTS

| 27869 | 8/1980 | European Pat. Off. | |
| 32158 | 7/1981 | European Pat. Off. | |
| 89794 | 9/1983 | European Pat. Off. | |
| 2251451 | 6/1975 | France | |
| 60711 | 5/1981 | Japan | 280/707 |
| 85705 | 5/1983 | Japan | 280/707 |
| 105813 | 6/1983 | Japan | 280/707 |
| 53223 | 3/1984 | Japan | |
| 63212 | 4/1984 | Japan | 364/424 |
| 623759 | 9/1978 | U.S.S.R. | 280/707 |
| 793823 | 1/1981 | U.S.S.R. | 280/707 |
| 2068308 | 8/1981 | United Kingdom | |

OTHER PUBLICATIONS

Mar. 1984 issue of "Auto World" written by Alan Baker.

Primary Examiner—John J. Love
Assistant Examiner—Everett G. Diederiks, Jr.

[57] ABSTRACT

An active suspension apparatus using hydropneumatic springs is disclosed to control damping characteristics in accordance with the vibration state of the passenger compartment of a vehicle during travel. An absolute acceleration of the floor of the passenger's compartment is detected and is compared with a reference value to discriminate the actual vibration state of the passenger compartment. The openings of restrictors arranged between hydropneumatic spring chambers and actuators are controlled in accordance with the discrimination result. In order to accurately detect the vibration state, specific vibration components are extracted by band-pass filters from the absolute acceleration signal.

19 Claims, 6 Drawing Sheets

ACTIVE SUSPENSION APPARATUS

BACKGROUND OF THE INVENTION

I. Field of the Invention

The present invention relates to an active suspension apparatus using hydropneumatic springs for suspending a vehicle body, i.e., the sprung mass on wheels, by utilizing fluid and gas pressures.

II. Statement of the Prior Art

Vehicles travel on smooth and rough roads in a wide velocity range between a low speed and a high speed. Under these circumstances, all possible travel conditions must be assumed and optimal control for rolling and pitching must be performed to satisfy a given travel condition. More specifically, when the vehicle travels along a smooth paved road, a relatively soft suspension is required. However, when a vehicle with a soft suspension rides over a joint in a pavement, the damping force is too small for the comfort of passengers. When the vehicle travels along a rough road, a relatively hard suspension is required. However, vibrations which resonate with internal organs cause discomfort to passengers. Thus, the damping force of the suspension system must be optimally controlled.

In a conventional vehicle suspension/damping apparatus having variable damping force characteristics, a vehicle velocity, a relative displacement between the body and the wheels, a relative velocity, and accelerations in the passenger compartment and the axle must be evaluated to change the damping forces. This conventional control technique is not based on the riding comfort of the passengers but on simple level control or control for a predetermined period of time. In this manner, the control operation does not precisely correspond to circumstances of the passenger's compartment in which the passenger ride.

In the conventional apparatus, an acceleration detecting means is arranged at part of the vehicle body to discriminate motion and vibrations of the body, thereby detecting the back-and-forth acceleration and deceleration and the vertical acceleration. However, the acceleration detecting means which is mounted at a position excluding a passenger's position is subjected to vibrations of the vehicle frame and constituting components such as auxiliary parts. As a result, vibrations felt by passengers cannot be precisely evaluated, resulting in inconvenience.

The riding comfort of passengers during travel is evaluated as soft or hard and stiff with respect to sprung resonant components. Riding sensation varies in accordance with passengers. When a driver personally controls riding comfort, a state evaluation standard which is closely associated with the passenger's comfort must be established to control the damping force of the vehicle.

SUMMARY OF THE INVENTION

It is an object of the present invention to solve the conventional problems described above. More particularly, the object of the present invention is to provide an active suspension apparatus, wherein vibrations directly felt by passengers are precisely evaluated, and damping force characteristics of hydropneumatic springs are optimally controlled in accordance with the evaluation results, thereby improving riding comfort and steering stability.

The present inventors made extensive studies to achieve the above object and examined how riding comfort of passengers as subjective evaluators can be used to evaluate travel conditions of a vehicle. The present inventors found that riding comfort was closely associated with acceleration at the passenger compartment floor. In this manner, the present inventors reached the conclusion that the vibration acceleration in the passenger compartment where the passengers were located and the vibration sensations of the passengers should be considered, thereby achieving the present invention.

An active suspension apparatus of the present invention using hydropneumatic springs for suspending a body of a vehicle on wheels by utilizing fluid and gas pressures, comprises: hydropneumatic suspension means including hydropneumatic springs, actuators, and restrictors respectively arranged between hydropneumatic spring chambers and said actuators; an acceleration detecting means for detecting an absolute acceleration $\ddot{Z}$ of a passenger's compartment where passengers are located; a controller having a comparator for comparing a signal generated from the acceleration detecting means with a reference value and for generating a signal representing a travel state of the vehicle; and a driving means for controlling an opening of a restrictor arranged between each hydropneumatic spring chamber and a corresponding actuator in accordance with road surface and travel state signals from the controller, thereby controlling damping force characteristics in accordance with a vibration state of the passenger's compartment of the vehicle during travel.

The arrangement of the present invention greatly improves the riding comfort of the passengers, since an acceleration (closely associated with vibration sensations of passengers) at the floor immediately below the seated passengers is used to evaluate the travel state and control the damping force characteristics, as compared with the conventional arrangement wherein the relative displacement between the axle and the body and a rate (i.e., a relative velocity) of change over time in relative displacement are detected.

In order to practice the present invention, the following aspects will be presented.

According to a first aspect, the controller comprises: a band-pass filter for extracting a frequency component of a frequency band of about 0.1 to 4 Hz causing passengers to feel a soft spring effect from a signal generated from the acceleration detecting means; and a comparator for comparing an extracted component signal with a reference value and generating a signal representing a travel state of the vehicle.

According to the first aspect of the present invention, since the signal component of the frequency band of 0.1 to 4 Hz corresponding to the soft vibration feeling of the passenger is filtered through the band-pass filter to control the damping force, soft damping can be obtained, and excessive vibrations can be prevented, thereby greatly improving the riding comfort.

According to a second aspect, the controller comprises: a band-pass filter for extracting a frequency component of a frequency band of about 0.1 to 4 Hz causing passengers to feel a soft spring effect from a signal generated from the acceleration detecting means; a band-pass filter for extracting a frequency component of a frequency band of about 4 to 8 Hz causing passengers to feel a hard and stiff spring effect from the signal generated from the acceleration detecting means; an operation circuit for multiplying the extracted component signals of frequency bands of 0.1 to 4 Hz and 4 to 8 Hz with coefficients, respectively, and for calculating a difference between the resultant products; and a comparator for comparing a difference signal from the operation circuit with the reference value and generating a signal representing a travel state of a vehicle.

The principle of control according to the second aspect of the present invention will be described with reference to FIGS. 2 and 3.

The riding comfort during travel of the vehicle can be expressed by a soft spring component of 0.1 to 4 Hz and a hard and stiff spring component of 4 to 8 Hz. These components include sprung resonant components. Referring to FIG. 2, the soft spring component P is plotted along the abscissa, and the hard and stiff spring component Q is plotted along the ordinate. The road surface state and the travel state (e.g., a vehicle velocity) can be plotted as points on the coordinate system. Assume that a vehicle travels under the same conditions while a damping force is decreased (solid curves Oa and Ob of FIG. 3) and is increased (broken curves Oc and Od of FIG. 3). When the damping force is decreased, the soft spring component P of the acceleration signal in the passenger's compartment is increased. However, when the damping force is increased, the hard and stiff spring component Q is increased. Various ratios of the soft spring components to the hard and stiff spring components are measured. In this case, when the difference between the soft and hard and stiff spring components P and Q exceeds a predetermined value, the riding comfort is found to be degraded.

Figure 2:
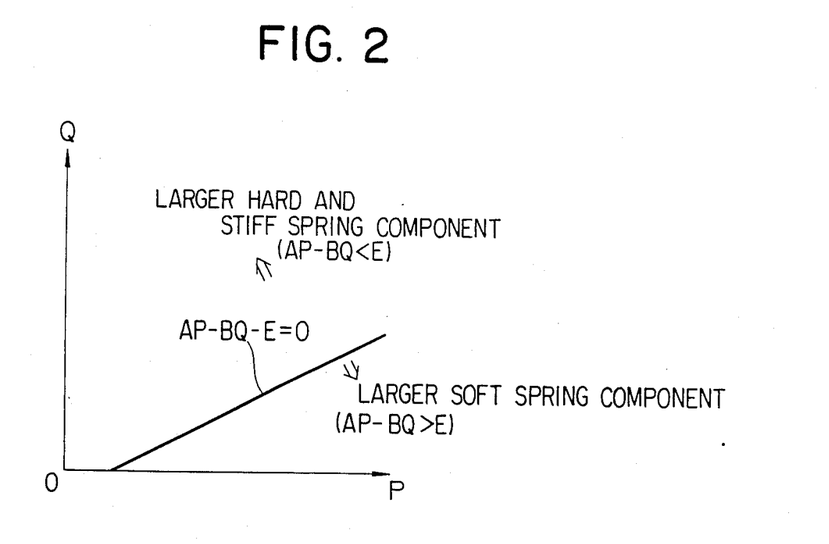
FIGS. 2 and 3 are respectively graphs for explaining the principle of control according to the second aspect of the present invention.
Figure 3:
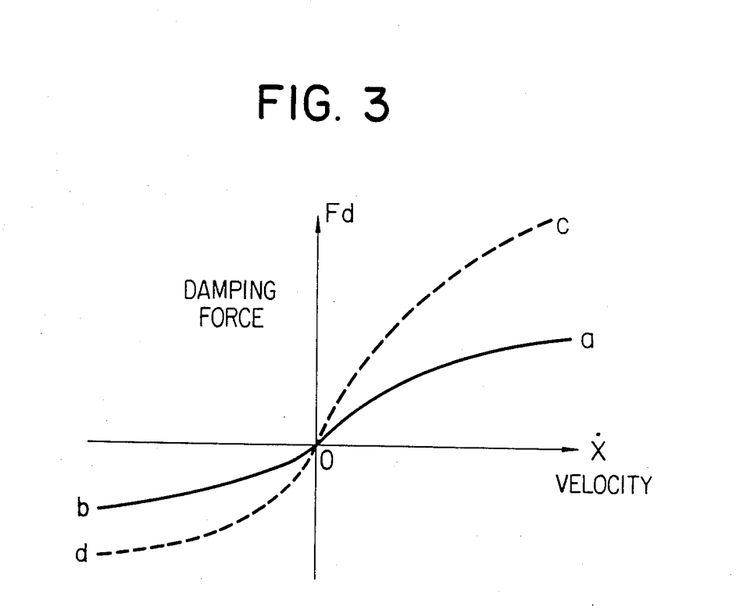

According to the second aspect, in a region $(AP-BQ>E)$ where A is the coefficient of the soft spring component P, B is the coefficient of the hard and stiff spring component Q, and E is the value, i.e., the reference value, representing a desired spring force for a passenger) where a soft spring component AP is larger than a hard and stiff spring component BQ, these components being divided by a line $(AP-BQ-E=0)$ of FIG. 2 during travel of the vehicle, the restrictors are closed to increase the damping force, as indicated by broken curves Oc and Od of FIG. 3. However in a region $(AP-BQ \leq E)$ where the hard and stiff spring component Q is larger than the soft spring component P, the restrictors are opened to decrease the damping forces, as indicated by solid lines Oa and Ob of FIG. 3.

According to the second aspect of the present invention, since the damping force characteristics of the hydropneumatic springs are controlled in accordance with the soft and hard and stiff spring components P and Q which are closely associated with the riding comfort of a passenger, the riding comfort can be improved irrespective of the road surface states. At the same time, the soft riding characteristic of the hydropneumatic springs can be utilized.

According to a third aspect of the present invention, in the active suspension apparatus of the second aspect, the comparator in the controller continuously generates a signal representing the relation $AP-BQ-E=0$ so that the ratio of the soft component P of 0.1 to 4 Hz to the hard and stiff component Q of 4 to 8 Hz in the acceleration signal of the passenger's compartment in different travel states of the vehicle has a linear relationship of the line $(AP-BQ-E)$ of FIG. 2, thereby causing the driving means to continuously change the opening of each restrictor arranged between each hydropneumatic spring and the corresponding actuator and hence controlling the damping force characteristics of the suspensions. According to the third aspect, since the damping force characteristics are continuously changed in accordance with a given road state, riding comfort can be improved irrespective of the road conditions. At the same time, the soft riding characteristic of the hydropneumatic springs can be provided.

The above and other objects, advantages and features of the present invention will be more apparent from the following description of a preferred embodiment thereof presented in conjunction with the accompanying drawings.

DETAILED DESCRIPTION OF THE PREFERRED EMBODIMENTS

Figure 1:
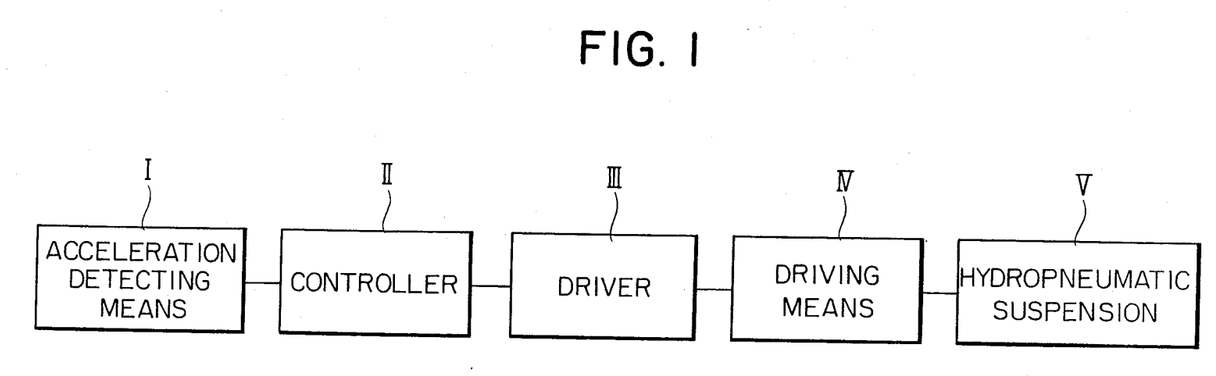
FIG. 1 is a block diagram showing a basic arrangement of an active suspension apparatus according to the present invention.

FIG. 1 is a block diagram showing the basic common arrangement of the active suspension apparatuses of the following embodiments of the present invention.

The active suspension apparatus comprises an acceleration detecting means I arranged inside the passenger compartment of a vehicle, a controller II for processing an acceleration signal $\ddot{Z}$ detected by the acceleration detecting means I, a driver III for amplifying an output signal generated from the controller II, and a driving means IV for controlling the opening of a restrictor arranged between each hydropneumatic spring chamber of a hydropneumatic suspension V and a corresponding actuator in accordance with an output signal generated from the driver III.

Figure 4:
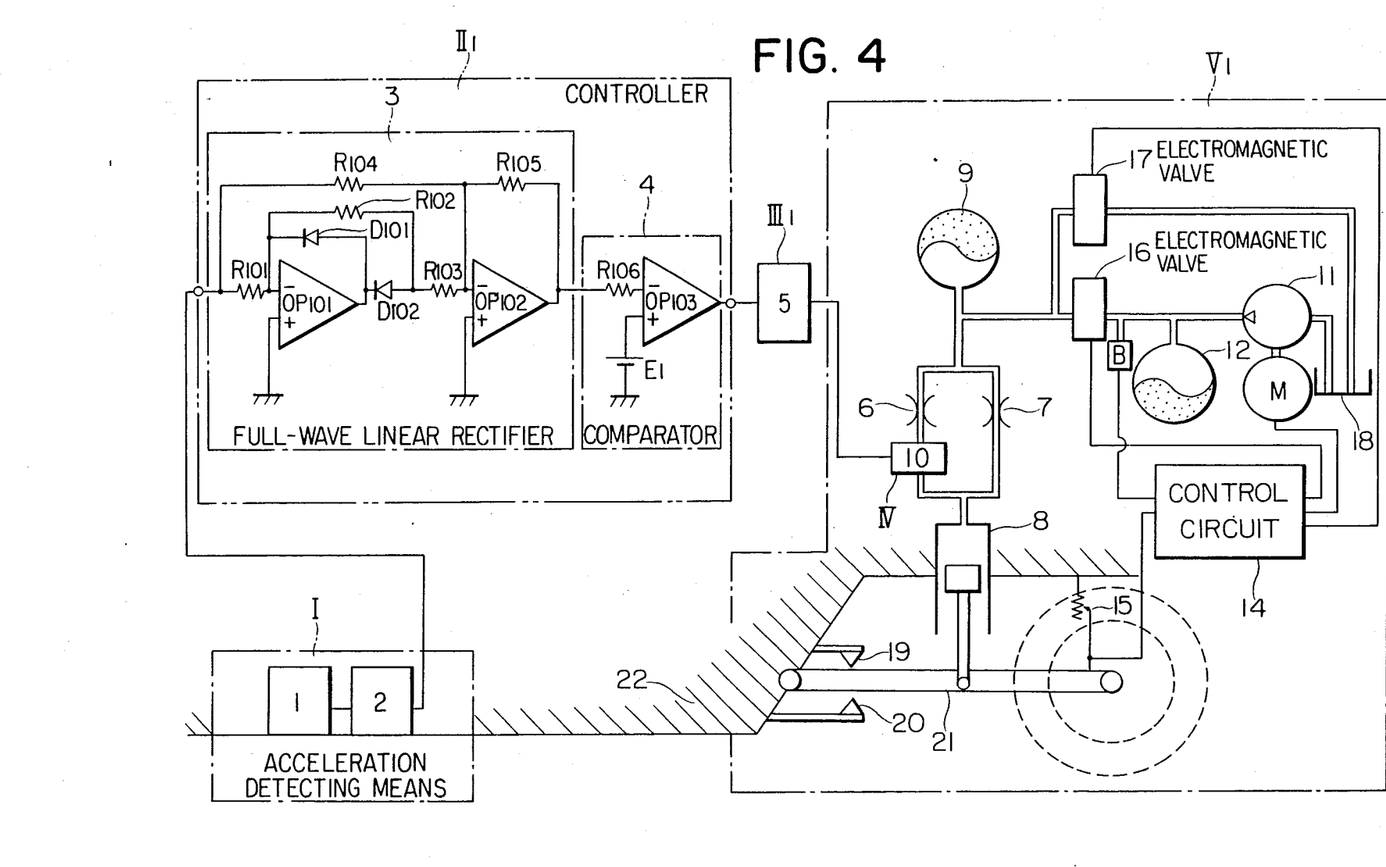
FIG. 4 is a diagram showing the system of a first embodiment of the present invention.

FIG. 4 shows the detailed arrangement of an active suspension apparatus according to a first embodiment of the present invention.

An acceleration detecting means I1 of the active suspension apparatus comprises an acceleration sensor 1 and an amplifier 2 which are fixed on the floor of the passenger compartment of the vehicle. The acceleration detecting means I1 detects an acceleration $\ddot{Z}$ during travel of the vehicle.

A controller II1 comprises a full-wave linear rectifier 3 connected to the output of the amplifier 2 in the acceleration detecting means I1 and a comparator 4 for comparing the output from the full-wave linear rectifier 3 with a reference value.

The full-wave linear rectifier 3 comprises a half-wave linear rectifier which is constituted by an operational amplifier OP101, resistors R101 and R102 and diodes D101 and D102 and which inverts and amplifies only a positive half cycle, and an inverting adder constituted by an operational amplifier OP102 and resistors R103 to R105. The full-wave linear rectifier 3 generates a full-wave rectified signal $|\ddot{Z}|$ (i.e., a signal representing the absolute value of the acceleration $\ddot{Z}$) of the acceleration $\ddot{Z}$.

The comparator 4 comprises an operational amplifier OP103 and a reference voltage source E1 and compares the output signal $|\ddot{Z}|$ generated from the full-wave linear rectifier 3 with the reference voltage E1. When the output signal from the full-wave linear rectifier 3 is smaller than the reference voltage E1, the comparator 4 generates an output signal.

A driver III1 comprises an amplifier 5 connected to the comparator 4 in the controller II1 to amplify the output signal from the comparator 4 so as to drive the driving means IV.

A hydropneumatic suspension V1 of the first embodiment serves as a trailing arm suspension of a rear wheel and comprises an actuator 8 arranged between an independent movable arm and the body, a damping force restrictor path, a hydropneumatic spring 9 and nonlinear rubber bushes 19 and 20.

A driving means IV1 comprises a restrictor switching electromagnetic valve 10 for controlling the restrictor path in accordance with the signal generated from the driver III1.

The damping force restrictor path which plays an important role in the driving means IV1 and the suspension V1 will be described. Restrictors 6 and 7 are arranged in parallel with each other in the path for causing the hydraulic actuator 8 to communicate with the hydropneumatic spring 9. The electromagnetic valve 10 is arranged in the path having the restrictor 6. When the valve 10 is opened, the restrictors 6 and 7 are both opened. However, when the valve 10 is closed, only the restrictor 7 is opened.

When the driver III1 does not generate the output signal, i.e., when the absolute value $|\ddot{Z}|$ of the acceleration signal exceeds the reference value, the electromagnetic valve 10 is controlled to open both the restrictors 6 and 7, thereby decreasing the damping force. However, when the output signal is generated from the driver III1, i.e., when the absolute value $|\ddot{Z}|$ of the acceleration signal does not exceeds the reference value, the electromagnetic valve 10 is driven to close the restrictor 6, and only the restrictor 7 is held open, thereby increasing the damping force.

Other arrangements of the suspension V1 will be described hereinafter.

A fluid compressed by a hydraulic pump 11 is accumulated in an accumulator 12. A pressure of the fluid is detected by a pressure sensor B, and a detection signal therefrom is supplied to a control circuit 14. A motor M for driving the hydraulic pump 11 is turned on/off in response to instruction from the control circuit 14, so that the fluid is kept in a predetermined pressure range.

The vehicle height is detected by a potentiometer 15 arranged between a trailing arm 21 and a vehicle body 22. A signal from the potentiometer 15 is supplied to the control circuit 14. When the height represented by the detection signal is lower than a predetermined height, the control circuit 14 supplies a control signal to an electromagnetic valve 16 which is then opened, so that the fluid accumulated in the accumulator 12 is supplied to the hydraulic actuator. However, when the height exceeds the predetermined height, the control circuit 14 supplies the control signal to an electromagnetic valve 17 which is then opened, so that the fluid in the hydraulic actuator 8 is exhausted in a tank 18, thereby controlling the actual height to the target height.

As described above, the active suspension comprises the restrictors 6 and 7, the restrictor switching electromagnetic valve 10, the hydraulic actuator 8, the hydropneumatic spring 9 and the nonlinear spring rubber bushes 19 and 20 and is arranged between the trailing arm 21 and the body 22.

According to the first embodiment having the hydraulic and suspension systems described above, the height control is performed in accordance with the signal from the displacement detecting means of each wheel. When the height is controlled to fall within the allowable range, the altitude of the vehicle can be kept constant even if a load acts on the rear seat and in the trunk.

As described with reference to the active suspension apparatus of the first embodiment, since the road surface state on which the vehicle travels and the travel state are detected by the absolute acceleration $|\ddot{Z}|$, the travel state signal provides good riding comfort and steering stability. The travel state signal is used to control the damping force characteristics of the hydropneumatic springs, so that riding comfort and steering stability can be improved for any travel state.

Furthermore, according to the first embodiment, the rubber bushes arranged in parallel with the hydropneumatic springs are deformed to sequentially increase the spring characteristics of the suspension system. The steering stability can be further improved. In particular, when the vehicle is rapidly turned, the rubber bushes serve as bound stoppers to damp an external excessive load, thus providing a secondary effect.

Furthermore, according to the first embodiment, the active suspension apparatus has a hydropneumatic path, so that the vehicle height can be controlled at a desired level by using a predetermined hydropneumatic material cooperating with the accumulator and the electromagnetic valve. The height can be kept at a given level irrespective of load. In addition, since the stroke margin of the wheels can be small, the height can be low. The aerodynamic characteristics can be improved, and the contact between the wheels and ground can thus be improved. Concurrently, fuel consumption can be decreased.

Figure 5:
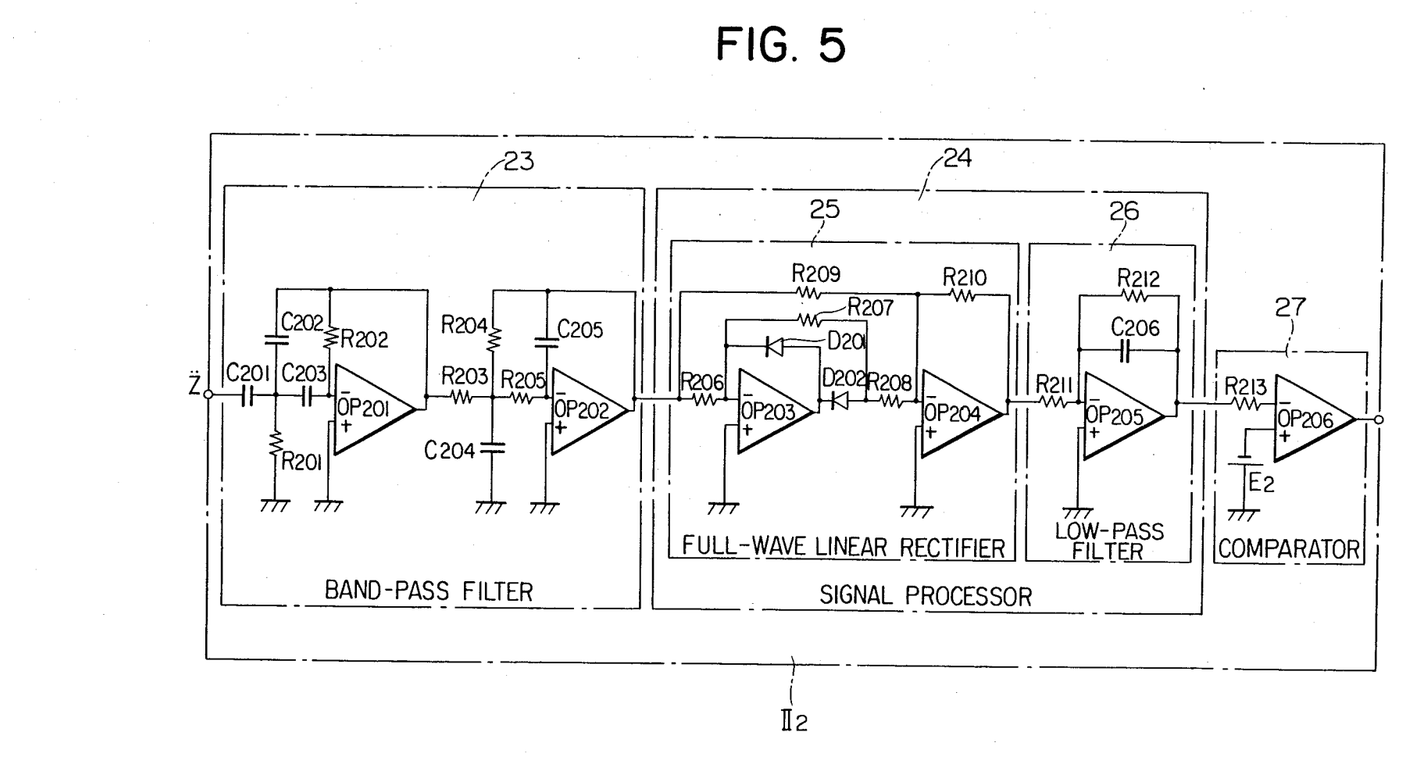
FIG. 5 is a circuit diagram of a controller according to a second embodiment of the present invention.

An active suspension apparatus according to a second embodiment belonging to the first aspect will be described with reference to FIG. 5.

The active suspension apparatus of the second embodiment is substantially the same as that of the first embodiment, except for the arrangement of the controller. Only a controller II2 will be described hereinafter.

The controller II2 of the second embodiment comprises: a band-pass filter 23 for extracting the soft spring component P of the acceleration signal $\ddot{Z}$ detected by an acceleration detecting means I2; a signal processor 24 for processing the output signal from the band-pass filter 23 to obtain an effective signal; and a comparator 27 for comparing the output signal from the signal processor 24 with the reference value.

The band-pass filter 23 comprises a high-pass filter which is constituted by an operational amplifier OP201, resistors R201 and R202 and capacitors C201 to C203 and which has a cut-off frequency of about 0.1 Hz, and a low-pass filter which is constituted by an operational amplifier OP202, resistors R203 to R205, and capacitors C204 and C205 and which has a cut-off frequency of about 4 Hz. The band-pass filter 23 extracts the soft spring component P of 0.1 to 4 Hz from the acceleration signal $\ddot{Z}$ as the input signal thereto.

The signal processor 24 comprises a full-wave linear rectifier 25 and a low-pass filter 26. The full-wave linear rectifier 25 comprises a half-wave linear rectifier which is constituted by an operational amplifier OP203, resistors R206 and R207 and diodes D201 and D202 and which inverts and amplifies the positive half cycle, and an inverting adder constituted by an operational amplifier OP204 and resistors R209 and R210. The signal processor generates a signal $|P|$ (i.e., a full-wave rectified signal of the soft spring component P) representing the absolute value of the component P.

The low-pass filter 26 comprises an operational amplifier OP205, resistors R211 and 212 and a capacitor C206 and inverts and smooths the output $|P|$ from the full-wave linear rectifier 25 to generate a signal $-P$. The comparator 27 comprises a resistor R213, an operational amplifier OP206 and a reference voltage source $-E2$ and compares the output $-P$ from the low-pass filter 26 with the reference voltage $-E2$. When the output signal from the low-pass filter 26 is smaller than the reference voltage, the comparator 27 generates an output signal.

When the soft spring component P is larger than the reference value E2, the controller II2 generates a signal which is then amplified by a driver III3, thereby closing the restrictor switching electromagnetic valve and hence increasing the damping force. However, when the soft spring component P is smaller than the reference value E, the controller II2 does not generate the output signal, and the restrictor switching electromagnetic valve is opened to decrease the damping force.

According to the active suspension apparatus of the second embodiment, the frequency component (i.e., the soft spring component) of 0.1 to 4 Hz is extracted from the acceleration signal $\ddot{Z}$. When the extracted component exceeds the reference value representing a desired vibration level to be felt by a passenger, the damping force is increased to decrease an excessively soft spring effect which is a drawback of the hydropneumatic spring. At the same time, soft riding, as an advantage of the hydropneumatic spring, can be utilized, thereby improving riding comfort as a whole.

An active suspension apparatus according to a third embodiment belonging to the second aspect of the present invention will be described with reference to FIG. 6.

The active suspension apparatus of the third embodiment is substantially the same as that of the second embodiment, except for the arrangement of the controller. Only the arrangement of a controller II3 of the third embodiment will be described hereinafter.

Figure 6:
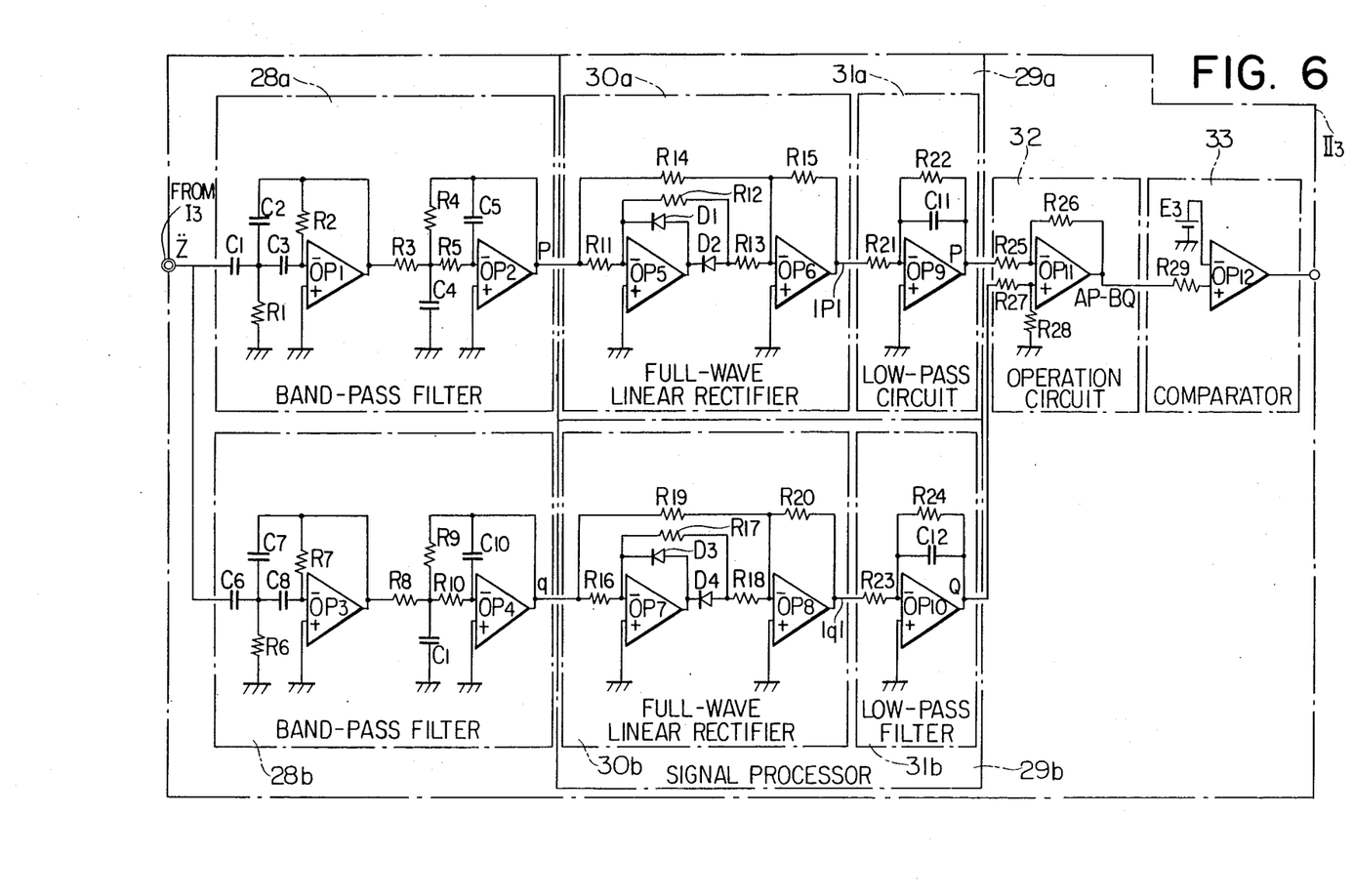
FIG. 6 is a circuit diagram of a controller according to a third embodiment of the present invention.

As shown in FIG. 6, the controller II3 comprises band-pass filters 28a and 28b connected to the output of an acceleration detecting means I3 to respectively extract the soft spring component P of 0.1 to 4 Hz and the hard and stiff spring component Q of 4 to 8 Hz, signal processors 29a and 29b for receiving the outputs from the band-pass filters 28a and 28b and generating effective signals, respectively, an operation circuit 32 for multiplying the outputs from the signal processors 29a and 29b with corresponding coefficients and calculating a difference between the resultant products, and a comparator 33 for comparing the output signal from the operation circuit 32 with the reference value.

The band-pass filter 28a comprises a high-pass filter constituted by an operational amplifier OP1, resistors R1 and R2 and capacitors C1 and C2, and a low-pass filter constituted by an operational amplifier OP2, resistors R3 to R5 and capacitors C4 and C5. The band-pass filter 28a extracts the soft spring component P of 0.1 to 4 Hz.

The band-pass filter 28b comprises a low-pass filter constituted by an operational amplifier OP3, resistors R6 and R7 and capacitors C6 to C8, and a high-pass filter constituted by an operational amplifier OP4, resistors R8 to R10 and capacitors C9 and C10. The band-pass filter 28b extracts the hard and stiff spring component Q of 4 to 8 Hz of the acceleration signal $\ddot{Z}$. The signal processors 29a and 29b comprise full-wave linear rectifiers 30a and 30b and low-pass filters 31a and 31b, respectively.

The full-wave linear rectifier 30a comprises a half-wave linear rectifier which is constituted by an operational amplifier OP5, resistors R11 and R12 and diodes D1 and D2 and which inverts and amplifies only the positive half cycle, and an inverting adder constituted by an operational amplifier OP6 and resistors R13 to R15. The full-wave linear rectifier 30a generates a full-wave rectified signal $|P|$ (i.e., a signal representing the absolute value of the component P) of the soft spring component P.

The full-wave linear rectifier 30b comprises operational amplifiers OP7 and OP8, resistors R16 to R20 and diodes D4 and D5 and generates a signal $|Q|$ obtained by full-wave rectifying the component Q.

The low-pass filter 31a comprises an operational amplifier OP9, resistors R21 and R22 and a capacitor C11 and inverts and smooths the output $|P|$ of the full-wave linear rectifier 30a to generate a signal $-P$.

The low-pass filter 31b comprises an operational amplifier OP10, resistors R23 and R24 and a capacitor C12 and inverts and smooths the output $|Q|$ of the full-wave linear rectifier 30b to obtain a signal $-Q$.

The operation circuit 32 comprises an operational amplifier OP11, and resistors R25 to R28. The operation circuit 32 multiplies the output signals from the low-pass filters 31a and 31b with corresponding coefficients and calculates a difference between the resultant products. The coefficient A of the soft spring component P is determined by the resistors R25 and R26 to be $A = R26/R25$. The coefficient B of the hard and stiff spring component Q is determined by the resistors R25 to R28 to be $B = \{(R25 + R26) \cdot R28\}/\{R25 \cdot (R27 + R28)\}$. The operation circuit 32 generates an output $(AP - Q)$.

The comparator 33 comprises a resistor R29, an operational amplifier OP12 and a reference voltage source E3 and compares the output signal $(AP - BQ)$ from the operation circuit 32 with the reference voltage E3. When the output signal from the operation circuit is larger than the reference voltage, the comparator 33 generates an output signal.

When the output signal $(AP - BQ)$ from the operation circuit 32 exceeds the reference voltage E3, that is, $(AP - BQ) > E3$, the controller II3 generates an output signal which is then amplified by a driver III3, so that the restrictor switching electromagnetic valve is closed to increase the damping force. However, when the output signal $(AP - BQ)$ from the operation circuit 32 does not exceed the reference value, the controller II3 does not generate the output signal, so that the restrictor switching electromagnetic valve is opened to decrease the damping force.

According to the active suspension apparatus of the third embodiment, the soft spring component of 0.1 to 4 Hz and the hard and stiff spring component of 4 to 8 Hz are extracted from the acceleration signal Ż detected in the passenger compartment. The damping force is controlled as to whether or not the difference between the soft and hard and stiff spring components exceeds the reference value. The riding comfort can be improved irrespective of road surface conditions. At the same time, soft riding, as the advantage of the hydropneumatic spring, can be effectively utilized.

Figure 7:
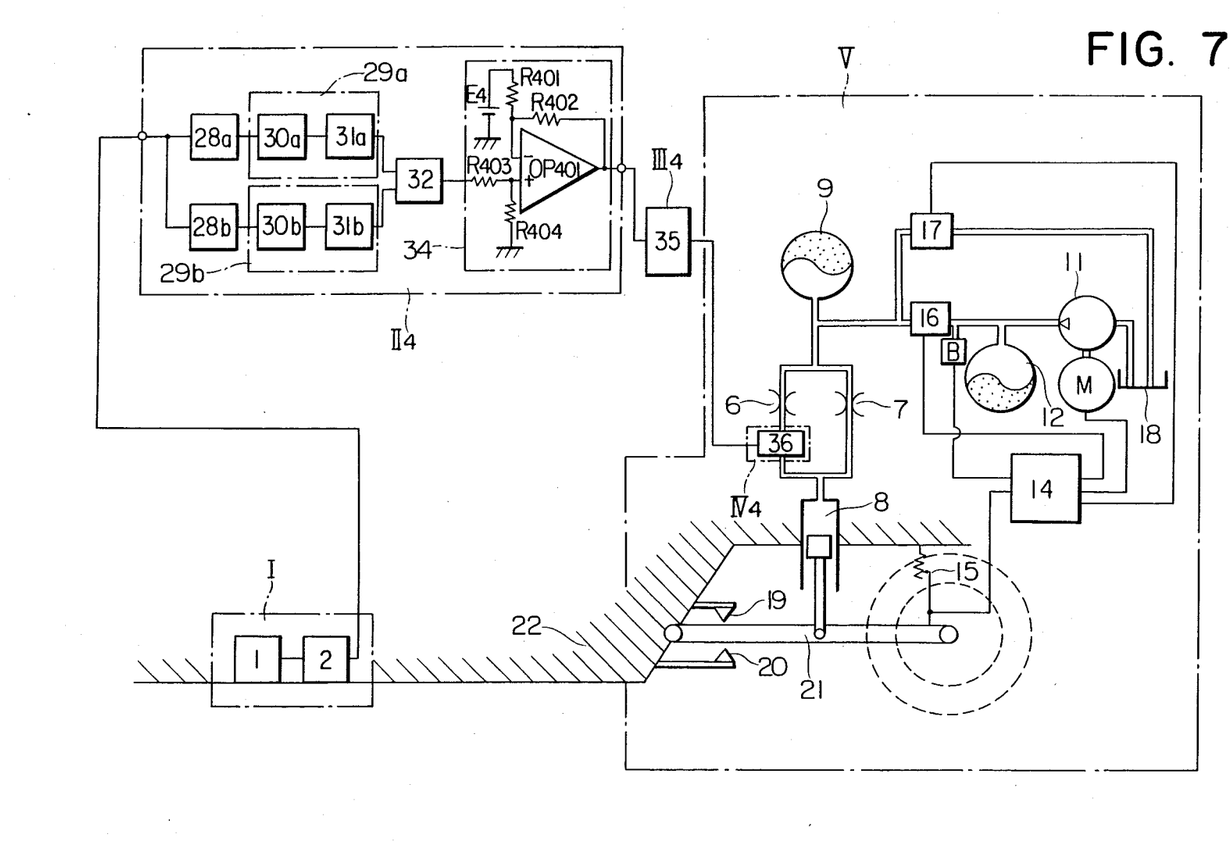
FIG. 7 is a diagram showing the system of a fourth embodiment of the present invention.

An active suspension apparatus according to a fourth embodiment belonging to the third aspect of the present invention will be described with reference to FIG. 7. The basic system configuration of the fourth embodiment is constituted by an acceleration detecting means I4, a controller II4, a driver III4, a driving means IV4 and hydropneumatic suspensions V4 in the same manner as in FIG. 1.

The apparatus of the fourth embodiment is substantially the same as that of the third embodiment, except for the controller II4 and the driving means IV4 which will be described hereinafter. The controller II4 comprises band-pass filters 28a and 28b, signal processors 29a and 29b, an operation circuit 32 and a comparator 34. The same reference numerals as in the controller II4 denote the same parts as in the controller II3, and a detailed description thereof will be omitted.

The comparator 34 comprises an operational amplifier OP401, resistors R401 to R404 and a reference voltage source E4. The comparator 34 compares the output signal from the operation circuit 32 with the reference voltage E4 and generates a signal $(AP-BQ)-E4$.

The driver III4 comprises an amplifier 35 which is connected to the output of the comparator 34 to amplify the output from the comparator 34 so as to drive the driving means IV4. The driving means IV4 comprises a restrictor control valve 36 for controlling the damping force restrictor path in accordance with the signal from the driver III4. The output signal $(AP-BQ)-E4$ from the controller II4 is amplified by the driver III4. When the signal $(AP-BQ)-E4$ is larger than the reference value, the opening of the restrictor control valve 36 is decreased to increase the damping force. However, when the signal $(AP-BQ)-E4$ is smaller than the reference value, the opening of the restrictor control valve 36 is increased to decrease the damping force.

According to the active suspension apparatus of the fourth embodiment of the present invention, the damping force is continuously changed in accordance with the road surface state. Therefore, riding comfort can be improved irrespective of road surface states. In addition, soft riding, as the advantage of the hydropneumatic spring, can be effectively utilized.

When the hydropneumatic suspension according to the present invention is considered for a vehicle having only one wheel, a pressure Pa in the actuator is given as follows:

$$M\ddot{Z}=KPa-MG$$

where

M: the sprung mass (kg) of the vehicle
Ż: the acceleration (m/s²) of the sprung mass
Pa: the pressure (pa) in the actuator
K: the constant
g: 9.8 m/s²

As is apparent from the above equation, the pressure in the actuator is in proportion to the acceleration. Instead of using the acceleration sensor and the amplifier shown in FIGS. 4 and 7, the acceleration detecting means of FIG. 1 may comprise a pressure sensor for detecting the pressure in the actuator so as to obtain a signal corresponding to the acceleration.

When the pressure detecting means in the actuator, the controller and the driving means for controlling the opening of the restrictor are provided in units of wheels, four-wheel independent control can be performed to obtain high-precision operation. The signal processor may comprise a circuit for converting the output signal from the band-pass filter to an effective signal. For example, the signal processor may be an effective value circuit for generating an effective value or a peak hold circuit for detecting a peak and generating a peak hold signal.

What is claimed is:

1. An active suspension apparatus using hydropneumatic springs for suspending a body of a vehicle on wheels by utilizing fluid and gas pressures, comprising:
   hydropneumatic suspension means including an actuator supported by a trailing arm connected to a wheel of the vehicle, said actuator including a piston, a hydropneumatic spring and means connecting said hydropneumatic spring and said actuator and including a restrictor;
   acceleration detecting means, located at a floor of a passenger compartment where passengers are located, for detecting an absolute acceleration of said passenger compartment, said acceleration detecting means comprising an acceleration meter arranged on the floor of the passenger compartment to detect vertical acceleration of said floor;
   a controller for comparing an output signal generated from said acceleration detecting means with a reference value and generating a travel state signal; and
   driving means for controlling opening of said restrictor in accordance with a signal from said controller, whereby damping force characteristics are controlled by controlling the opening of the restrictor in accordance with a vibration state of the passenger compartment during travel of the vehicle.

2. An apparatus according to claim 1, wherein said controller comprises a full-wave linear rectifier for full-wave rectifying the acceleration signal generated from said acceleration detecting means and generating a signal representing an absolute value of the acceleration signal, and a comparator for comparing an output signal generated from said full-wave linear rectifier with the reference value to generate the travel state signal.

3. An apparatus according to claim 2, wherein the reference value in said comparator can be arbitrarily determined by the passenger.

4. An apparatus according to claim 1, wherein a plurality of paths each having said restrictor arranged between each said hydropneumatic spring and said corresponding actuator are formed parallel to each other, at least one of said paths being provided with a restrictor switching electromagnetic valve for opening/closing said path, said restrictor switching electromagnetic valve being controlled by said driving means such that said restrictor switching electromagnetic valve is opened to decrease a damping force when the absolute value of the acceleration signal is detected by said comparator to be larger than the reference value, and such that said restrictor switching electromagnetic valve is closed to increase a damping force when the absolute value of the acceleration signal is detected by said comparator to be smaller than the reference value.

5. An apparatus according to claim 1, further comprising: displacement detecting means for detecting a relative displacement between the body and a wheel; and height control means for controlling a fluid pressure of said hydropneumatic spring to obtain a predetermined height in accordance with an output from said displacement detecting means.

6. An apparatus according to claim 5, wherein said displacement detecting means comprises a potentiometer inserted between a trailing arm of each suspension and the body.

7. An apparatus according to claim 5, further comprising pressure detecting means which is constituted by a pressure sensor for detecting, as a fluid pressure of said hydropneumatic spring, a pressure in said actuator.

8. An apparatus according to claim 7, wherein said displacement detecting means having said pressure sensor is arranged for each wheel, and said controller and said driving means for controlling the opening of said restrictor are arranged as a unit for each wheel.

9. An apparatus according to claim 7, wherein a signal from said pressure sensor in said pressure detecting means is obtained by calculating said acceleration signal from said acceleration detecting means.

10. An apparatus according to claim 1, wherein said controller comprises a band-pass filter for extracting a frequency component of 0.1 to 4 Hz from the acceleration signal generated from said acceleration detecting means, said frequency component including a soft spring component, and a comparator for comparing an extracted component signal with a reference value and generating the travel state signal.

11. An apparatus according to claim 10, wherein said controller further comprises a signal processor which is constituted by a full-wave linear rectifier for full-wave rectifying an output generated from said band-pass filter and for generating a signal representing an absolute value of the rectified signal and a low-pass filter for smoothing the signal from said full-wave linear rectifier, said signal processor being inserted between said band-pass filter and said comparator.

12. An apparatus according to claim 11, wherein said signal processor comprises an effective value circuit for obtaining an effective value of the output generated from said band-pass filter.

13. An apparatus according to claim 11, wherein said signal processor comprises a peak hold circuit for detecting and generating a peak value of the output generated from said band-pass filter.

14. An apparatus according to claim 11, wherein a plurality of paths each having said restrictor arranged between said each hydropneumatic spring chamber and said corresponding actuator are formed parallel to each other, at least one of said paths being provided with a restrictor switching electromagnetic value for opening/closing said path, said restrictor switching electromagnetic valve being controlled by said driving means such that said restrictor switching electromagnetic value is opened to decrease a damping force when.the output signal from said operation circuit is detected by said comparator to be larger than the reference value, and such that said restrictor switching electromagnetic valve is closed to increase a damping force when the output signal from said operation circuit is detected by said comparator to be smaller than the reference value.

15. An apparatus according to claim 10, wherein a plurality of paths each having said restrictor arranged between said each hydropneumatic spring chamber and said corresponding actuator are formed parallel to each other, at least one of said paths being provided with a restrictor switching electromagnetic valve for opening/closing said path, said restrictor switching electromagnetic valve being controlled by said driving means such that said restrictor switching electromagnetic valve is closed to increase a damping force when the soft spring component of .the acceleration signal is detected by said comparator to be larger than the reference value, and such that said restrictor switching electromagnetic valve is opened to decrease a damping force when the soft spring component of the acceleration signal is detected by said comparator to be smaller than the reference value.

16. An apparatus according to claim 15, wherein said controller comprises: a first signal processor having a first full-wave linear rectifier and a first low-pass filter between said first band-pass filter and said operation circuit, said first full-wave linear rectifier being arranged to full-wave rectify the output generated from said first band-pass filter and generating a signal representing an absolute value of the output generated from said first band-pass filter, said first low-pass filter being arranged to smooth an output from said first full-wave linear rectifier; and a second signal processor having a second full-wave linear rectifier and a second low-pass filter between said second band-pass filter and said operation circuit, said second full-wave linear rectifier being arranged to full-wave rectify the output generated from said second band-pass filter and generating a signal representing an absolute value of the output generated from said second band-pass filter, said second low-pass filter being arranged to smooth an output from said second full-wave linear rectifier.

17. An apparatus according to claim 15, wherein said comparator continuously generates the travel state signal, and said driving means continuously controls the opening of said restrictor arranged between said each hydropneumatic spring chamber and said corresponding actuator in accordance with the travel state signal generated from said comparator.

18. An apparatus according to claim 15, wherein
a plurality of paths each having said restrictor between said each hydropneumatic spring chamber and said corresponding actuator are formed parallel with each other, at least one of said paths being provided with a restrictor control valve for controlling the flow rate of said path,
said comparator subtracts a reference voltage value from an output signal voltage of said operation circuit and generates a voltage signal representing a subtracted result, and
said driving means controls the opening of said restrictor in inverse proportion to the output signal voltage of said comparator.

19. An apparatus according to claim 1, wherein said controller comprises: a first band-pass filter for extracting a frequency component of 0.1 to 4 Hz from the acceleration signal generated from said acceleration detecting means, the frequency component of 0.1 to 4 Hz including a soft spring component felt by passengers; a second band-pass filter for extracting a frequency component of 4 to 8 Hz from the acceleration signal generated from said acceleration detecting means, the frequency component of 4 to 8 Hz including a hard and stiff spring component felt by passengers; an operation circuit for multiplying the frequency components of 0.1 to 4 Hz and 4 to 8 Hz with corresponding coefficients and for calculating a difference between resultant products; and a comparator for comparing an output signal generated from said operation circuit with the reference value to generate the travel state signal.

* * * * *